(12) United States Patent
Kocherginsky

(10) Patent No.: US 11,705,571 B2
(45) Date of Patent: Jul. 18, 2023

(54) FOIL-BASED REDOX FLOW BATTERY

(71) Applicant: Nikolai M. Kocherginsky, Urbana, IL (US)

(72) Inventor: Nikolai M. Kocherginsky, Urbana, IL (US)

(*) Notice: Subject to any disclaimer, the term of this patent is extended or adjusted under 35 U.S.C. 154(b) by 0 days.

(21) Appl. No.: 16/547,285

(22) Filed: Aug. 21, 2019

(65) Prior Publication Data

US 2020/0075985 A1    Mar. 5, 2020

Related U.S. Application Data

(60) Provisional application No. 62/727,374, filed on Sep. 5, 2018.

(51) Int. Cl.

| | |
|---|---|
| *H01M 8/18* | (2006.01) |
| *H01M 12/08* | (2006.01) |
| *H01M 8/0228* | (2016.01) |
| *H01M 8/0206* | (2016.01) |
| *H01M 8/0215* | (2016.01) |
| *H01M 8/0221* | (2016.01) |
| *H01M 8/0234* | (2016.01) |

(Continued)

(52) U.S. Cl.
CPC .......... *H01M 8/20* (2013.01); *H01M 8/0206* (2013.01); *H01M 8/0215* (2013.01); *H01M 8/0221* (2013.01); *H01M 8/0228* (2013.01); *H01M 8/0234* (2013.01); *H01M 8/188* (2013.01); *H01M 12/08* (2013.01)

(58) Field of Classification Search
None
See application file for complete search history.

(56) References Cited

U.S. PATENT DOCUMENTS

| | | |
|---|---|---|
| 3,996,064 A | 12/1976 | Thaller |
| 4,121,018 A | 10/1978 | Kocherginsky et al. |
| 8,524,398 B2 | 9/2013 | Holme et al. |

(Continued)

FOREIGN PATENT DOCUMENTS

JP   2017224486 A  * 12/2017

OTHER PUBLICATIONS

Shishikura et al., JP 2017224486 Machine Translation (Year: 2017).*

(Continued)

*Primary Examiner* — Ula C Ruddock
*Assistant Examiner* — Anna Korovina
(74) *Attorney, Agent, or Firm* — David F. Dockery; The Navitas Intellectual Property Group LLC

(57) ABSTRACT

A flow-through redox galvanic cell and a battery is described, where each flow-through galvanic cell is separated into two parts by a metal foil serving as a bi-electrode in contact with two solutions having different redox potentials. Voltage due to redox processes is formed through the foil, and two traditional electrodes (cathode and anode) in each cell are not necessary anymore. The cells in a battery should be in electric contact with each other via ion-selective membranes. The battery is easy to recharge, and it is smaller, lighter, safer and cheaper than known redox-flow batteries. It may be used as a reserve source of energy in electric grids and households. It also may be used in electric cars, and it is especially attractive for use near the seashore and on sea ships.

9 Claims, 2 Drawing Sheets

(51) Int. Cl.
  *H01M 12/00*   (2006.01)
  *H01M 8/20*    (2006.01)

(56) References Cited

U.S. PATENT DOCUMENTS

| | | | |
|---|---|---|---|
| 8,728,662 | B2 | 5/2014 | Suguro et al. |
| 8,906,572 | B2 | 12/2014 | Krishnan et al. |
| 9,017,869 | B2 | 4/2015 | Nakaishi et al. |
| 9,692,077 | B2 | 6/2017 | Esswein et al. |
| 9,799,907 | B2 | 10/2017 | Kocherginsky |
| 9,991,540 | B2 | 6/2018 | Batawi et al. |
| 9,991,543 | B2 | 6/2018 | Esswein et al. |
| 9,993,874 | B2 | 6/2018 | Shivanath et al. |
| 10,014,546 | B2 | 7/2018 | Goeltz et al. |
| 2005/0244707 | A1 | 11/2005 | Skyllas-Kazacos et al. |
| 2008/0261099 | A1 | 10/2008 | Nguyen et al. |
| 2008/0292964 | A1 | 11/2008 | Kazacos et al. |
| 2011/0200890 | A1* | 8/2011 | Kocherginsky ..... H01M 8/1032 429/402 |
| 2013/0177789 | A1* | 7/2013 | Holasut et al. ....... H01M 8/188 429/70 |
| 2014/0272484 | A1* | 9/2014 | Li ............................ H01M 8/20 429/51 |
| 2014/0295311 | A1* | 10/2014 | Lipka .................... H01M 8/188 429/452 |
| 2015/0079497 | A1* | 3/2015 | Lavastre ............... H01M 8/188 429/513 |
| 2016/0126581 | A1* | 5/2016 | Timofeeva ............ H01M 8/188 429/81 |
| 2016/0181626 | A1* | 6/2016 | Madabusi ........... H01M 8/0239 429/105 |
| 2018/0241107 | A1* | 8/2018 | Su ......................... H02J 7/0068 |

OTHER PUBLICATIONS

Zanzola et al., "Redox Solid Energy Boosters for Flow Batteries: Polyaniline as a Case Study", Electrochimica Acta, vol. 235, May 1, 2017, pp. 664-671, http://dx.doi.org/10.1016/j.electacta.2017.03.084), (Year: 2017).*
Ed Fontes, Does the Current Flow Backwards Inside a Battery?, Comsol Blog, Nov. 25, 2015 (Year: 2015).*
Screen Capture from YouTube video clip entitled "Fuel Cell (02-5) Fuel cell type—Stack Structure", 1 page, uploaded on Nov. 4, 2018 by user Kan-Lin Hsueh. Retrieved from the Internet Nov. 16, 2020: https://www.youtube.com/watch?v=dcEIKCcESI4 (Year: 2018).*
Liu et al., "Sustainability-inspired cell design fora fully recyclable sodium ion battery", Nature Communications, (2019), 10, 1965; https://doi.org/10.1038/s41467-019-09933-0 (Year: 2019).*
Lu et al., "Bipolar Electrodes for Next-Generation Rechargeable Batteries", Adv. Sci. 2020, 7, 2001207; DOI: 10.1002/advs.202001207 (Year: 2020).*
Redox Flow Batteries for Stationary Storage, Technologies and Markets, by Lorenzo Grande, PhD, presentation slides (emphasis, Slide 14).

* cited by examiner

FOIL-BASED REDOX FLOW BATTERY

CROSS-REFERENCE TO RELATED APPLICATIONS

The present application claims benefit of U.S. Provisional Application Ser. No. 62/727,374 filed Sep. 5, 2018 and titled FOIL-BASED REDOX FLOW BATTERY, the entire disclosure of which is hereby expressly incorporated by reference herein.

FIELD OF TECHNOLOGY

This disclosure relates to an electrochemical battery, in particular to a flow-through redox battery in which voltage is generated not on two different redox electrodes (cathode and anode) but on an electron-conducting foil, separating two solutions with different redox active substances.

BACKGROUND

A detailed explanation of electrochemical terminology used in this description may be found in U.S. Pat. No. 9,692,077 B2 (2017) and Bagotsky et al., 2014.

An electrochemical battery is a group of galvanic cells connected in series. Each cell has two electrodes, cathode and anode, so that an anode of a first cell is electrically connected to the cathode of a second, etc. Anode reacts with a reducing component Red (1) in the galvanic cell and takes an electron from it. A simplest example is Zn anode, which takes electrons from Zn atoms on a surface, which become $Zn^{2+}$ cations and move to an aqueous solution. Electrons are transferred via wire to the cathode in the next cell. This cathode gives electrons to an oxidant (Ox) in this cell, and reduces it. A simplest example is reduction of $Cu^{2+}$ ions and formation of Cu metal on the electrode. The process is driven by the difference of chemical redox potentials between two electrodes, but it would stop instantaneously because of the charge separation and formation of electric potential difference (contact potential). An electrical field formed in the system due to electron transport counteracts and balances the chemical driving force. In equilibrium electric potential on each electrode is described by the Nernst law, $$E = E_0 - \frac{RT}{nF}\ln\frac{Red}{Ox},$$

where $E_0$ characterizes the redox reaction of the electrode, and it is called standard redox potential. R is universal gas constant, F—Faraday's constant, T—absolute temperature, and n is the number of electrons taken by an oxidant when it is transformed into the reduced form.

The situation is different when electron current in the wire connecting anode and cathode may be converted at the electrode surface into ionic current in a solution. Then it is necessary to convert an ionic current into the electron current on the next anode, etc., from one cell to another. Voltage on each cell is the difference of an anode and cathode potentials, and it is determined by both standard redox potentials and concentrations of the reagents near electrodes:

$$\Delta E = \Delta E_0 - \frac{2.3RT}{nF}\log\frac{Red(c)Ox(a)}{Ox(c)Red(a)}.$$

Red(c) and Ox(c) are activities of reducing and oxidizing form of a reagent near cathode, Red(a) and Ox(a) are activities of reducing and oxidizing form of a reagent near anode. Concentrations and pH near anode and near cathode may be different if the electrodes are separated by an ion-conducting membrane. If both reagents near cathode and anode are the same, $\Delta E_0 = 0$. If n=1, changes of concentration of one form of a redox reagent at room temperature by ten times give changes of voltage only by 58 mV, thus voltage on each cell is mainly determined by the difference of standard chemical potentials. Finally, open circuit voltage between the first cathode and the last anode is equal to the total of elementary voltages formed on each galvanic cell in the battery.

The metal/metal cation electrodes are known as the electrodes of the first kind. Electrodes like Ag/AgCl with insoluble salt of the metal are known as the electrodes of the second kind, and they are usually used as reference electrodes because of their constant voltage and low polarization when electric current is flowing in the system.

In a simplest case the electrodes are inserted into aqueous electrolyte solution. A cathode and anode are in contact with electrolyte, but they are separated in space to avoid short circuiting. In addition, they are often separated by an ion-exchanging membrane. Ion-exchange membranes not only separate two electrodes, but they also allow using different electrolytes and pH in two solutions, separated by the membrane. Ion-exchange membranes in aqueous solution have low electric resistance, transport of ions through the membrane is described by Ohm's law when current is drawn from the battery, and no polarization is observed on the membrane. Again, according to the Nernst equation, ideally a $H^+$-selective membrane would form the transmembrane potential difference near 58 mV, if pH in two solutions is different by one unit (plus in the more alkaline solution).

The most well-known is $H^+$-permeable perfluorosulfonic acid-based Nafion™ membrane, produced by DuPont since 1970. Radiation-chemical synthesis of homogeneous cation- and anion-exchange membranes is described in Rosenblum N. D., Kocherginskaya L. L., 1993.

The major characteristics of the battery are open circuit voltage, internal electric resistance of the battery, and total energy, which may be provided by the battery per unit of its volume (energy density, watt-hours/liter) or per unit of weight (specific energy, watt-hours/kilogram). To improve the last characteristic electrodes often take almost all the internal volume of the cell, or the metal electrodes may simultaneously serve as a cell container wall. Each galvanic cell in this case is a closed (sealed) system, and the whole battery is contacting with the external load via the first and the last electrodes (terminal electrodes serving as current collectors).

Another approach is taken in fuel cells, where oxygen supplied directly from air is serving as an oxidant, finally forming water on a cathode. Reducing agents on the anode, such as hydrogen gas, also may be supplied continuously, so that the total energy now is not limited by the amount of chemicals in the battery. There is a possibility to combine these two approaches, as it is done in zinc-air batteries or fuel cells. In this case during discharge a mass of Zn particles forms a porous anode, which is saturated with an electrolyte. Oxygen from the air reacts at the cathode, and forms hydroxyl ions, which then migrate and form zincate $(Zn(OH)_4^{2-})$ This leads to electron transport to the cathode In zinc-air fuel cells zinc metal is added as paste and zinc oxide is removed continuously. Theoretically the cell should give 1.65V, though in practice it gives near 1.4V.

When the battery is connected to a load, and electric current is drawn, the voltage on the battery is determined not only by electrode potentials, but also by ohmic resistance of the solutions and membrane, plus possibly slow reactions on the electrodes. Retarded processes on the electrodes are not described by Ohm's law. Instead, they lead to the electrode polarization, and to get the same exchange current on the electrode one has to apply higher voltage. To decrease electrochemical resistance, one must use different catalysts, e.g. Pt in fuel cells, or synthetic γ-modification of manganese dioxide (see U.S. Pat. No. 4,121,018). The difference with equilibrium Nernst potential is called overpotential. To achieve the same current and low overpotential one has to have high exchange current per unit area of the electrode (it may change by 6-7 orders of magnitude, depending on the nature of electrode surface and redox components). Total current is proportional to the surface area of the electrode and concentration of the regents. That is why the porous carbon electrodes have found a broad application. In addition, they should be hydrophilic, so that water and dissolved chemicals can penetrate into the pores. Stirring or flow-through arrangement decreases the thickness of unstirred layers and decreases polarization, if it is limited by mass transfer to the electrode.

Relatively new redox flow-through electrochemical cells are similar to fuel cells, but chemical energy in this case is provided by chemical components dissolved in liquids and separated by an ion-selective membrane. They are described in many Patents and Patent Applications, such as U.S. Pat. No. 3,996,064, 2005/0244707 A1, and 2008/0292964. The fundamental difference of flow cells and conventional batteries is that the energy is stored not as electrode material, but in the dissolved redox components.

In a flow-through cell both liquids circulate in their own spaces through the cell by pumps, and the pairs of redox components react on two electrodes. In a flow-through cell it is possible to use two similar electrodes, because it is dissolved redox pairs giving and taking electrons and not the electrodes, which leads to voltage generation. The most common electrodes in this case are carbon-based electrodes. Porous carbon-based or graphite felt electrodes are not consumed in the electrode reaction. They do not dissolve and do not grow, changing its size as with metal electrodes, and they are known as electrodes of the third kind. In some cases, an electrode of the third kind may be in contact with a solution, which has two pairs of redox-active components. Each of these pairs interacts with the electrode, giving and taking electrons, which leads to the formation of non-equilibrium electrode potential, which is called mixed potential, and is determined by the exchange currents of those components.

The most well-known vanadium-based redox flow battery is an assembly of electrochemical cells, in which two porous carbon electrolytes are separated by the $H^+$ permeable membrane. Concentrated sulfuric acid-based electrolyte in the positive half-cell contains $VO_2^+$ and $VO^{2+}$ ions. The negative half-cell has $V^{3+}$ and $V^{2+}$, also in sulfuric acid. Initially the voltage on one cell is near 1.4V. When the cell is discharged, $VO_2^+$ takes an electron and is reduced to $VO^{2+}$. In the opposite solution $V^{2+}$ is converted into $V^{3+}$, giving the electrons. The process is reversible. This means it is also possible to apply the external voltage, to reverse the processes and to recharge the battery, thus storing electric energy in a chemical form. That is why vanadium-based redox flow batteries already have found a wide practical application in electric grids where it may be used as a reserve source of energy. Nevertheless, there are at least three serious problems with this system. The first one is that concentrated sulfuric acid in large volumes is rather dangerous. The second one is that vanadium is a rare and rather expensive element, and the third problem is that there is leakage of ions through a membrane from one solution into another, thus decreasing total time to use the battery.

Starting with the very first electrochemical battery, suggested in 1799, based on zinc and copper in contact with the brine, and known as Volta pile, all batteries have two separate electrodes. In case of cathode and anode, the electrodes have to be dissimilar. In fuel cells and redox flow batteries the electrodes may be similar, and they are called negative and positive electrodes. Though redox active chemicals are continuously delivered into the fuel cells and redox flow-through cells, electrodes still take an essential part of the cell volume, and weight. In addition, each of electrochemical cells usually has solid walls and an electrode in one cell has to be electrically connected by a wire to another electrode in the next cell.

Starting from Galvani it is know that the difference of electric potentials in biology is generated without different cathodes and anodes. There are no metal electrodes in these systems. Instead it is generated on biological membranes and may reach more than 200 Volt in an electric organ of some eels. In this case many membranes form a stack and are connected in series. Discharge and electric current are observed only during a short spike, when ionic channels are open. In this sense electric organ reminds charged electrochemical capacitors, and not batteries.

Thus, an electrochemical flow-through battery is needed in which voltage is generated not on electrodes, but on thin metal foils and ion-exchange membranes, which imitate voltage generation on biological membranes. Disclosed here battery also is based on membranes, but some of them (foils) are redox active, and continuously give the voltage, which is larger than the one due to ion concentration differences. In this case only two electrodes are necessary, which serve as current collectors and simply connect the battery to the external load. The functional part of the battery becomes much smaller, lighter, simpler, safer and cheaper.

SUMMARY

Aspects of the invention provide a galvanic flow-through cell and a battery. Each cell is divided into two parts by a separator, which is a metal foil or another thin layer of an electron-conducting material. Electrolytes with reducing and oxidizing agents are flowing in two different parts of the cell, which leads to voltage generation on the separator. Galvanic cells are connected one to another via walls made of ion-exchange membrane, which gives electrochemical connection of the cells in series. The first and the last cell also have one electrode each serving as current collectors to connect the battery with the external load.

The battery does not have traditional cathode and anode in each cell, can work with aqueous solutions, and is much smaller and lighter than existing prototypes with comparable voltage, current, and power.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION

Figure 1:
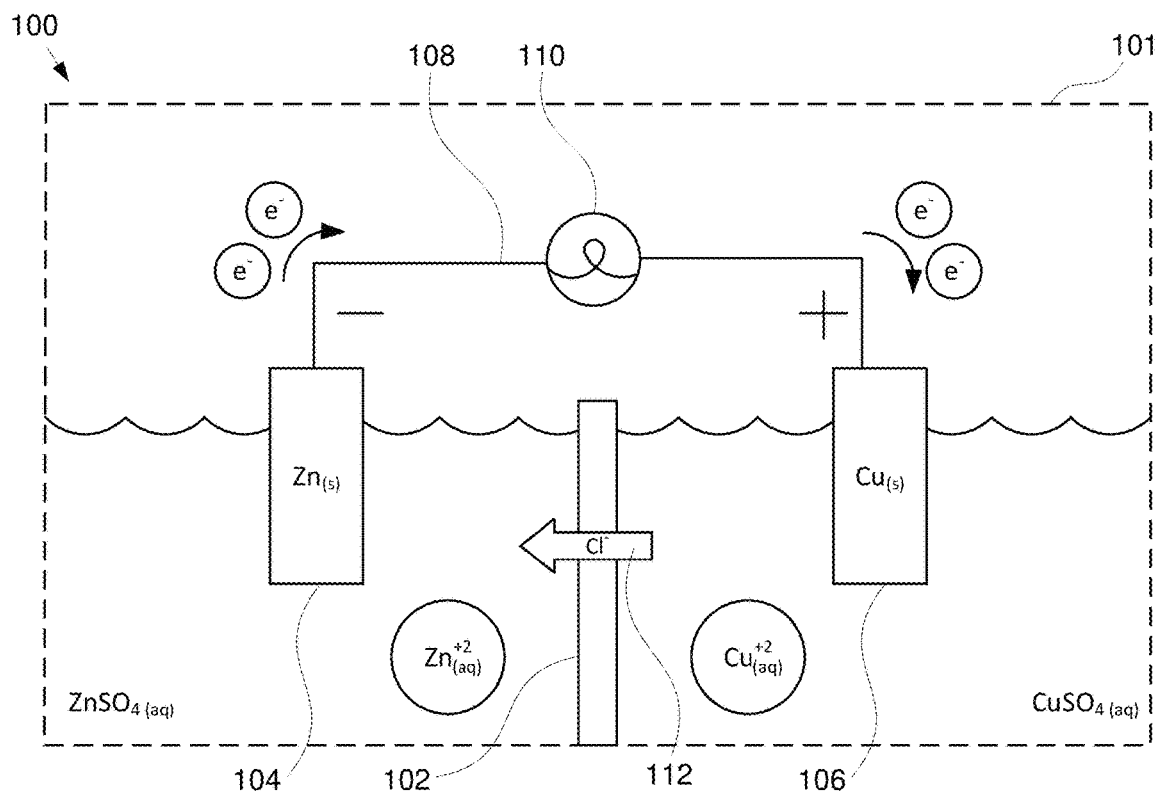
FIG. 1 is a schematic drawing of a traditional galvanic cell with a membrane.

FIG. 1 is a schematic drawing of a traditional electrochemical cell 100 with membrane 102. Two different electrodes of the first kind (zinc anode 104, copper cathode 106) are separated by the anion-selective membrane 102. Voltage is formed between the electrodes. Electrons are moving in the wire 108 and load 110 outside the cell 100, and anions are moving inside the cell in direction 112, forming a closed loop, so that the total transport process is electroneutral.

Figure 2:
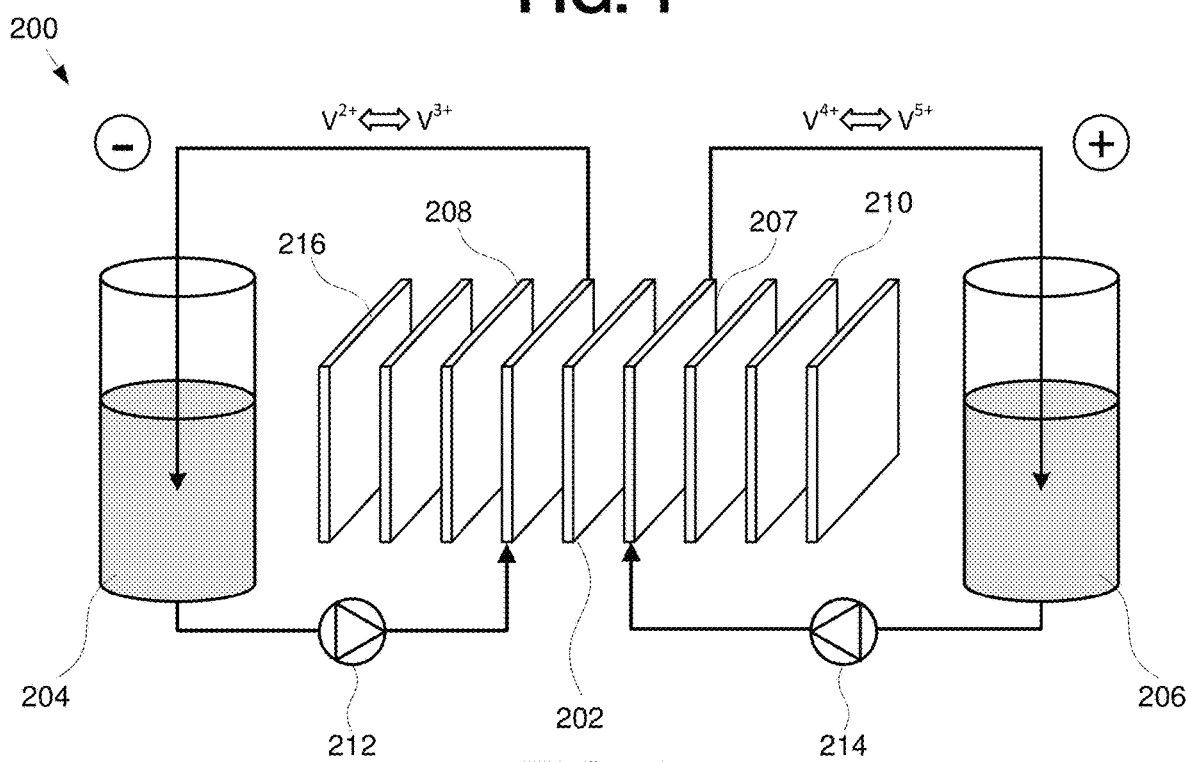
FIG. 2 is a schematic drawing of a conventional vanadium-based redox flow-through battery.

FIG. 2 is a schematic drawing of a conventional vanadium-based redox flow-through cell 200. Two solutions (anolyte solution 204, catholyte solution 206) with different composition and redox potentials are pumped (through pump 212 and 214 respectively) through a porous layer 207 of the cell 200, separated by an $H^+$-ion selective membrane 202. Dissolved redox active components react with electrodes 208, leading to the difference of electric potentials between the electrodes. Electrons move from one electrode to another outside the cell, and $H^+$ ions move in the same direction inside the cell, leading to electroneutrality of the process. Current collectors 210 connect the battery to a load. End plates 216 may cover the ends of the cell.

Figure 3:
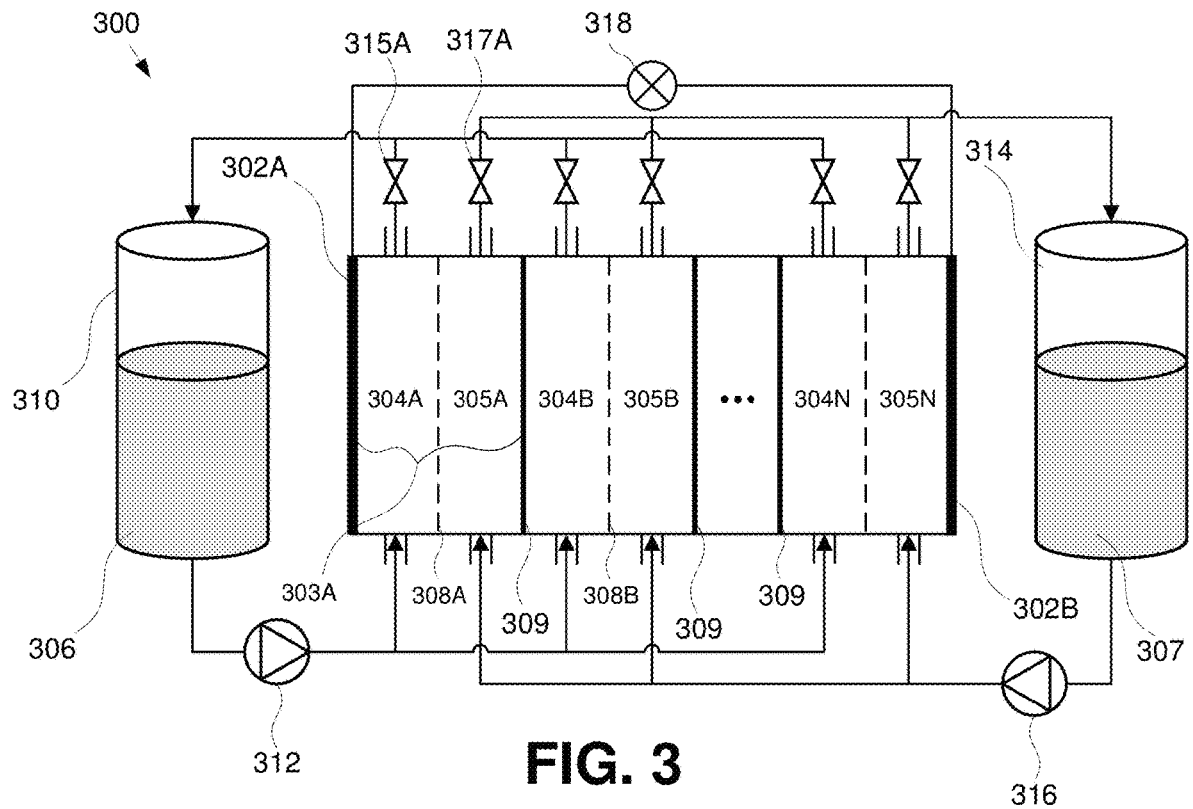
FIG. 3 is a schematic drawing of a foil-based redox flow-through battery, according to one of the embodiments.

FIG. 3 is a schematic drawing of one of possible embodiments of a foil-based redox flow battery 300. The battery 300, restricted by nonconducting walls, includes a first electrode 302A, serving also as a wall of the battery 300; a first cell 303A having a compartment 304A with reducing solution 306 flowing through it, a selectively electron-conducting foil separator 308A, a second compartment 305A with oxidizing agent 307 flowing through it; an ion-selective membrane 309; a second cell 303B having a compartment 304B with reducing solution 306 flowing through it, a selectively electron-conducting foil separator 308B, a second compartment 305B with oxidizing agent 307 flowing through it; ion-selective membrane 309; and so on until an Nth cell 303B comprising a first compartment 304N with reducing solution 306 flowing through it, a selectively electron-conducting foil separator 308N, a second compartment 305N with oxidizing agent 307 flowing through it; and another current-collecting electrode 302B. Reducing solution 306 is stored in the tank 310 and is pumped in recirculation mode with manifolds and valves (e.g., valve 315A) through the battery by a pump 312. Oxidizing solution 307 is stored in the tank 314, and s pumped in recirculation mode with manifolds and valves (e.g., valve 317A) through the battery by a pump 316. During battery discharge, electrodes 302A-B are connected to an external load 318.

In an alternative embodiment without recirculation, the feed tanks are above the battery, the fluids may flow down in compartments due to gravity into the collector tanks. In yet another embodiment the whole container for a battery is made of nonconducting material, and the two electrodes are inserted into the first and the last compartment, respectively.

Figure 4:
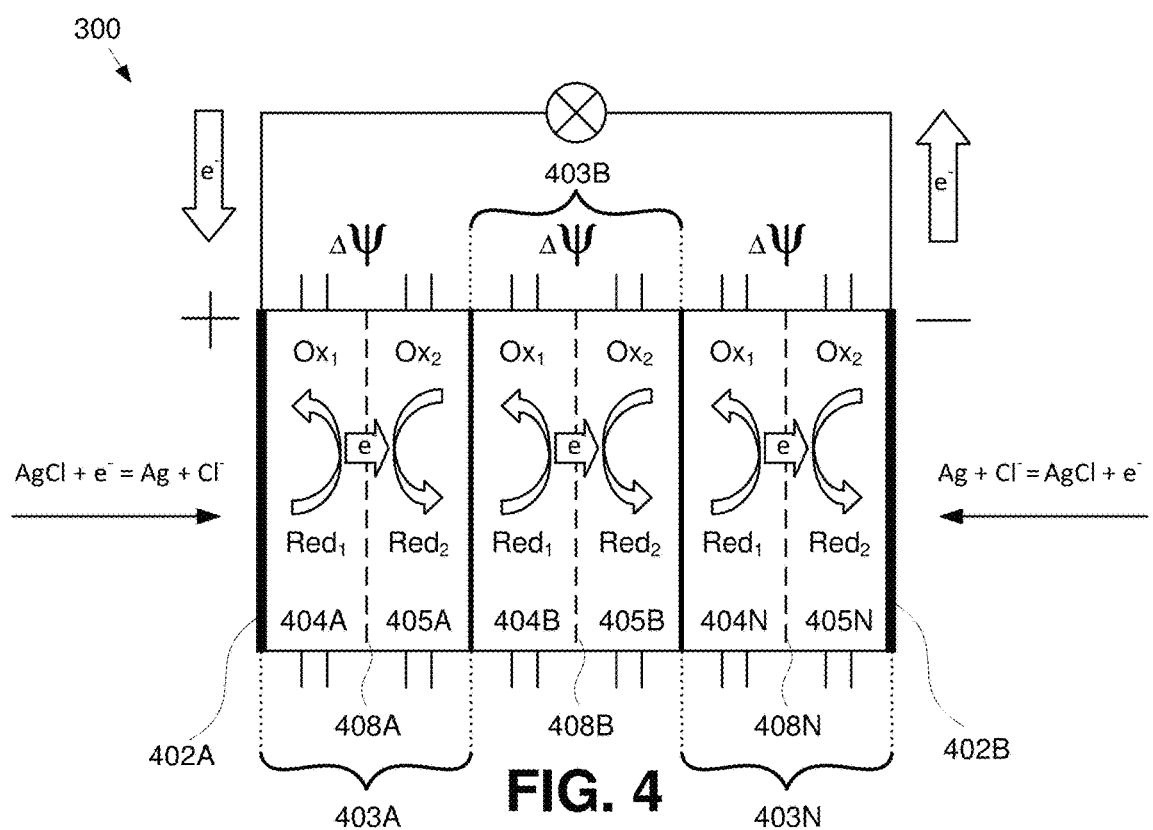
FIG. 4 is a schematic drawing showing the direction of movement of electrons and ions in the redox flow-through battery of FIG. 3 with foils serving as bi-electrodes.

FIG. 4 is a schematic drawing showing the direction of movement of electrons and ions in the redox flow battery of FIG. 3 with foils serving as bi-electrodes. Two solutions with different composition and redox potentials are pumped through the compartments 404A-N and 405A-N of cells 403A-N, separated by electron-conducting foil 408. Dissolved redox active components react with the foil 408, donating or taking electrons, and leading to the difference of electric potentials through the foil 408. Due to electron exchange of the reducing components of the donor solution with the foil 408, electrons move from one side of the foil 408 to another and are taken by the acceptor components in the oxidizing solution. Then ions move inside this solution, and finally again electrons move outside the cell, forming the closed loop and leading to electroneutrality of the process.

Previously (U.S. Pat. No. 9,799,907, 2017) we have disclosed a flow-through fuel cell, separated into two parts by a redox active and electron-conductive polymer membrane, including doped polyaniline-based membranes. Voltage was generated on this membrane when it separated two solutions with different redox potentials. The cells were connected by current collecting electrodes, for example nonpolarizable electrodes of the second kind. In this invention we disclose another principle of making the galvanic cell and a battery. Now we suggest having each cell separated into two parts by a metal foil, and the cells should be in electric contact with each other via ion-selective membranes.

When the cell is filled with the first aqueous solution of one redox pair in one side and with the second aqueous solution of another redox pair in another side, it is possible to measure transmembrane difference of electric potentials using a multimeter and two reference electrodes separated by the foil. In addition, using a Pt electrode and a reference electrode, both in one solution, it is possible to measure redox potential in this solution. Experiments demonstrate that when one solution has lower redox potential, and another solution has higher redox potential, it is possible to detect the difference of electric potential between solutions, separated by nonporous but electron-conducting foils. More negative potential was observed in the oxidizing solution, and more positive potential was observed in the reducing solution. This result is explained by ability of reducing agent to donate electrons to the metal foil. Then the electrons penetrate through the metal foil and react with the oxidizing agent on another surface of the foil, leading to the charge separation across the foil and to a measurable difference of electric potentials. In noncorrosive conditions trans-foil voltage was practically equal to the difference of redox potentials in the two solutions separated by the foil. When concentrations of the redox components were changed only in one side, trans-foil voltage practically followed the Nernst law.

Open circuit potential on a nonporous foil is determined by the difference of redox potentials in solutions at two interfaces. When the battery is connected to an external load, electric current goes through the system, and the side of the foil in contact with reducing solution may be considered as an anode, and another side in contact with an oxidant as a cathode. Thus, the foil behaves as a bi-electrode, i.e. as a combined anode from one traditional galvanic cell and a cathode from the next one. Thus, instead of two separate and large electrodes in a battery we have only one thin metal foil, which may be also considered as the membrane, selectively permeable for electrons and not for ions.

The effect may be observed on different metal foils, including platinum, gold, silver, aluminum, copper, stainless steel, etc. Examples of redox pairs added on one side of the foil are $Fe(CN)_6^{3-}/Fe(CN)_6^{4-}$ and $I_3^-/I^-$. For these pairs to act as reducing agents, concentrations of $Fe(CN)_6^{4-}$ and $I^-$ have to be much more than those of $Fe(CN)_6^{3-}$ and $I_3^-$. Both redox pairs may be used in water or water-salt solutions. In acidic solutions it is possible to use $Ce^{3+}/Ce^{4+}$ and $Fe^{2+}/Fe^{3+}$ as oxidants, especially if concentrations of $Ce^{4+}$ and $Fe^{3+}$ are high. The list of reducing and oxidizing agents, including organic polymers and suspensions, is not exhaustive, but redox couples, which may lead to formation of oxygen or hydrogen from water, should be avoided. It is preferable to use reversible redox pairs, so that they may be regenerated chemically or electrochemically when the battery is not in use.

To have a good current/voltage dependence electron-exchange currents on the foil interface should be high enough, so that redox equilibrium is established on the electrode interface, which is difficult to achieve for example with the system Pt/ascorbic acid or many other organic reducing agents. Exchange currents for different systems may change by 6-7 orders of magnitude, and with proper catalysts they may be as large as 1 $mA/cm^2$. It is possible to increase and optimize electron-exchange currents on both sides of the foil by using an asymmetric foil made of two layers of different metals chosen so that each of them can easily exchange electrons with the solutions it contacts.

Another way to increase electron-exchange currents is to cover the foil with the layer organic electron-conducting materials, such as acid-doped polyaniline, polypyrrole, and other electroconductive polymers known as synthetic metals, carbon nanotubes, and graphene. These layers have high porosity and high internal surface area, leading to increase of the exchange currents. Camphorsulphonic acid-doped polyaniline has conductivity up to 300 S/cm, and conductivity of aqueous solutions with supporting electrolytes usually is less than 1 S/cm. As a result, metal foils together with supported layers make just a small part of total battery resistance. In addition, they will also protect the foil from corrosion, thus increasing the lifetime of the battery. Also, there is no leakage of the redox components through the foil from one to another redox solution. As long as each compartment in the battery has inlet and outlet, and flowing-through fluid leads to constant renewal of the redox system, the lifetime of the battery becomes almost unlimited.

Additional way to increase the exchange currents is to use relatively low concentrations of redox mediators, taking or giving electrons to redox components in the solution, and then transferring them to or from the foil. Inexpensive and non-volatile redox mediator usually has standard redox potential between those of the two half reactions. The one for cathode is more negative than the oxidizer, and the one for anode needs to be more positive than the reducing agent (fuel) potential. Examples of known mediators are quinone derivatives, including anthraquinone sulfonate, NADH, NADPH, tetramethyl-para-phenylenediamine, derivatives of ferrocene/ferrocenium, etc. This list is not exhaustive, and other redox mediators, for example, used in membrane biophysics to study membrane respiration, may be used for this purpose.

Reversible redox reactions and electrochemical regeneration are used with flow-through batteries in electric grid systems, especially in the nighttime when there is an excess of electric energy, so that it may be converted into chemical energy and stored this way till the day time. Similarly to fuel cells and redox flow batteries redox agents after they went through the cells may be regenerated and reused again. This may be done either using electrochemical or chemical processes. For example, bromine dissolved in an oxidant solution and reduced in the cell to HBr may be regenerated by oxygen from air in a separate vessel before reuse. The same approach may be used for $Fe^{+3/+2}$ with oxygen, which have the standard redox potentials in acid 0.77V and 1.21V.

To provide electric current to a load the described flow-through battery should have two current collecting electrodes, one is in the first and another in the last galvanic cell. In one possible embodiment reversible and nonpolarizable Ag/AgCl electrodes are used for this purpose. If during the battery discharge one of these electrodes will practically loose its AgCl due to silver reduction, it is possible simply to switch mutual positions of flows of reducing and oxidizing agent, and to continue the process. In another embodiment electrodes may be common electrodes used in fuel or flow-through cells, for example, they may be based on carbon felt. The major function of this electrode is not generation of electric potential, but to convert ionic current in the solution into the electron current in the wire.

Everyone skilled in the art of electrochemistry will appreciate numerous possible modifications and variations, possible in the light of these teachings, and all such are contemplated hereby.

EXAMPLES

The following examples are provided to illustrate some of the concepts described within this disclosure and should not be considered as limiting more general embodiments.

Example 1

This example illustrates voltage formation through the foil when the standard redox potentials are different in two flowing solutions separated by the foil.

For $Ce^{3+}/Ce^{4+}$ in one solution and $Fe^{2+}/Fe^{3+}$ in another solution with all concentrations equal and 1M $H_2SO_4$ as a supporting electrolyte the trans-foil voltage with Pt foil is 0.65V. In comparison, the standard redox potential $Ce^{3+}/Ce^{4+}$ versus normal hydrogen electrode is 1.44V and that for $Fe^{2+}/Fe^{3+}$ is 0.77V with the difference 0.67V with the difference only slightly more that the experimental one.

Example 2

This example illustrates voltage formation through the foil when the standard redox potentials are the same in two flowing solutions separated by the foil. If one aqueous solution at neutral pH had the ratio of concentrations $Fe(CN)_6^{3-}/Fe(CN)_6^{4-}=1000$ (1M/ 1 mM) and another solution had $Fe(CN)_6^{4-}/Fe(CN)_6^{3-}=1000$, trans-foil voltage was near 350 mV. The result is less than observed using two separated by the foil redox pairs of different nature.

Example 3

It is possible to use cheap redox agents, such as hypochloride as an oxidant, and sulfide as a reducing agent. The standard redox potential for $ClO^-+H_2O+2e^-\rightarrow Cl^-+2OH^-$ is 0.89V and that for reaction $S+2e^-\rightarrow S^{2-}$ is −0.45V, giving the difference near 1.34V.

Example 4

This example illustrates additional voltage formation through the ion-exchange membrane. The same results as in Examples 1-3 are observed when the oxidizing or reducing solution is divided into two parts by additional ion-exchange membrane, so that the electrodes are separated by both the foil and the membrane. Transmembrane voltage is zero if solutions on both sides of the membrane are the same. In another experiment if the membrane is ideally anion-selective, and two separated by the membrane solutions have different concentrations of this anion, anions penetrate through the membrane, leading to additional charge separation and transmembrane voltage, determined by the ratio of anion concentrations in the second and third solution. 1000 times concentration difference (1M and 1 mM of Cl⁻ in two solutions) lead to 175 mV transmembrane voltage difference. As the result, total voltage provided by the system is increased.

Anions may be present in solutions because of the supporting electrolytes, added to increase electrical conductivity of solutions. They also may influence the exchange currents, forming metal complexes. Anions also can change the solubility of redox active metal ions. For example, $Fe^{3+}$ solubility in the presence of perchlorate may be as high as 2.5M. Increase of concentration leads to faster redox reactions on a foil, and to increase of current in the system.

Solutions separated by the foil may have different pH, for example, to optimize the exchange currents through two interfaces. If the reducing solution, donating electrons, has more acidic pH than the accepting solution, it is possible to use $H^+$ permeable membrane, so that $H^+$ will permeate from the second galvanic cell through the membrane, leading to an additional increase of generated voltage. In an ideal situation this will add near 58 mV per unit of pH difference. In the case of redox-active anions like ferro/ferricianide it is preferable to use cation-selective membrane, which is impermeable barrier for anions. Anion-selective membranes have low permeability for cations, so that crossover of redox active cations like $Fe^{3+}$ or $V^{3+}$, $V^{2+}$ and $VO^{2+}$ ions is not essential in this case, which is an important advantage in comparison to $H^+$-selective Nafion™ In addition, anion-selective membranes are much cheaper than Nafion™, which may cost near 30% of the battery cost.

It is possible to make some estimates illustrating the advantages of the disclosed battery. Nafion membrane NR212 has the thickness $5\times10^{-3}$ cm. Both the foil and the ion-exchange membrane may be made rather thin, i.e. less than 0.01 cm. For illustration only we may assume that each cell has specific conductivity 0.1 S/cm (resistivity 1052, *cm), area 1 cm² and thickness 0.1 cm, so that the cell resistance is 1Ω. If each cell gives 1 V, to provide 4V disclosed battery should have 4 elements. Theoretically we should have current 4V/4Ω=1 A. In comparison, the best Li batteries of similar size and voltage, which are used for pacemakers, have 3.6V and specific current near 0.06 A/cm².

If we have 120 cells in series, the length of the battery is 12 cm. Voltage is 120V and the resistance is 120Ω, giving the same 1 A current and power (voltage by current) 120W, i.e. enough to light an incandescent bulb in a room. Weight of the battery will be less than 15 g, and it can be very quickly recharged by hands using syringe and manifold.

Another comparison can be made with the 100 kW energy servers made by a company Bloom Energy, CA. Each cell in the server works at >900° C., and includes 10 cm×10 cm metal alloy plate coated with a nickel oxide on one side, forming an anode, and lanthanum strontium manganite layer or yttrium and scandium-stabilized zirconia on a cathode side. When oxygen from air reacts with fuel, a single solid oxide fuel cell (SOFC) generates 25 watt. The cell of the same size in the disclosed case will have resistance 0.01Ω. With voltage 1V on one cell the current will be 100 A, and the power provided by one cell will be 100 watt. The process may be conducted at room temperature, which makes it much more energy efficient, and easy to use. It also does not need expensive lanthanum or other rare elements (about $1500 per kg), making the system much cheaper. In addition, SOFC produces carbon dioxide as the result of fuel oxidation. This does not happen with the disclosed invention and is better for environment. Disclosed battery provides more environment friendly power supply, which is based on aqueous chemistry, and works without noise.

With provided by 1 cm² power equal to 1 W to have 210 kW (280 horsepower of electric car produced by Tesla) we need 21 m² area of the galvanic cells, which may be assembled into piles. If they have thickness 0.1 cm ($10^{-3}$ m), the total volume of a battery should be 21 L. It will be possible to recharge the battery at home, making the system of recharging stations for Li batteries unnecessary.

Important characteristic of a traditional battery is energy density, which is calculated per unit weight of closed battery. With flow-through battery, which stays unchanged during its work, this parameter does not have much sense. Two other values may be important. The first one is energy delivered by one liter of solution, which depends on the type and content of dissolved redox components, and for flow-through cells usually is less than 45 W*hr/L. To increase the content per litter it is possible to use dissolved redox active polymers, like polymerized nitroxide radicals and suspension of polyaniline. For example, it is possible to use suspension of polyaniline nanoparticles with content up to 300 g/L. In this case reduced polyaniline, known as leucoemeraldine, is added into the reducing donor solution, and its oxidized form, known as pernigraniline, is added into the oxidizing solution.

If solvent is recovered and recycled, in calculations it makes more sense to use the energy delivered by 1 kg of dissolved chemicals. For example, if we use $KClO_3$ as an oxidant, each molecule of it gives 6 electrons forming KCl. 1 mol of it (122 g) will give the charge 6 Farade, or $\sim 6\times10^5$ Q/mol. If transmembrane voltage is 1V, this gives the energy $6\times10^5$ J/mol, or in more common for batteries units $6\times10^5 \times 1000/(3600\times122)=1400$ W*hr/kg. In comparison, the best $Li(Ni,Co,Al)O_2$ batteries provide 600 W*hr/kg of the battery weight. Used for starters in motor vehicles rechargeable lead-acid batteries have specific energy only near 40 W*hr/kg.

The description of the invention and examples demonstrates that the disclosed system has all advantages typical for known redox flow-through batteries, but it also has important additional advantages. Instead of two electrodes in each cell the disclosed battery has just one thin foil, where the voltage due to redox processes is generated. Whereas a traditional battery with n cells (e.g., cell 101) requires 2n electrodes (e.g., electrode 104, electrode 106) and n membranes (membrane 102), the described invention only requires two electrodes serving as current collectors (e.g., electrodes 302A-B) across all cells (e.g., cells 303A-N), n electron-conducting foils (e.g., selectively electron-conducting foil separator 308A-N) and n−1 membranes (e.g., membrane 309). Each galvanic cell does not need to be separated from another by solid walls, but only by an ion-exchange membrane. Both these aspects make the system smaller and lighter.

The system gives a freedom of choice of not only fuel (reducing agent), but also of an oxidant. In some combinations it is possible to use oxygen from air to regenerate the oxidant. No expensive catalysts as Pt on carbon electrode for oxygen reduction are necessary. It is possible to use the invention with aqueous solutions at neutral pH and to avoid expensive Nafion membranes, necessary for concentrated acids. In stationary arrangements where salt solutions are easily available, such as on a seashore, on ships and submarines, this is an important advantage. This also makes the system safe and possible to use by a layman without special training. There will be no exhaust gases formed, which is an important environmental advantage in comparison to the combustion engines.

Cross-over (leakage) through the membranes, which is a serious problem with traditional batteries and flow-through systems, is not important for the battery with metal foils. Because of that the battery may be used in electricity production backup systems, including electric grids for many years. It will be also much smaller and less expensive than existing prototypes. It will be understood that changes and modifications may be made to the above-described invention without departing from the spirit and the scope thereof as set forth in the claims appended hereto.

Classification
Int. Cl.
  H01M 8/10 (2016.01)
  H01M 8/20 (2006.01)
  H01M 8/103 (2016.01)
  H01M 8/1032 (2016.01)
  H01M 8/1018 (2016.01)
US Cl.
  H01M 8/103 (2013.01); H01M 8/1032 (2013.01); H01M 8/20 (2013.01);
  H01M 2008/1095 (2013.01); Y02E 60/528 (2013.01)
Field of Classification Search
  H01M 8/103 (2013.01); H01M 8/1032 (2013.01); H01M 8/20 (2013.01);
  H01M 2008/1095 (2013.01); Y02E 60/528 (2013.01)

What is claimed is:

1. An electrochemical battery for supplying electrical power to an external load, consisting essentially of:
  a plurality of electrochemical flow-through cells including a first cell, a last cell and at least one intermediate cell disposed between the first cell and the last cell,
    wherein the first flow-through cell, the last flow through-cell and the at least one intermediate flow-through cell are each divided into two compartments by a thin selectively electron permeable metal foil separator of a plurality of thin selectively electron-permeable metal foil separators that are not permeable to ions;
  wherein each of the plurality of flow-through cells are connected in series via a plurality of ion-selective membranes that are permeable to ions to permit ion transfer between adjacent cells;
  wherein two solutions with different redox potentials flow through an entire volume of the two compartments in each of the first cell, the last cell and the at least one intermediate flow-through cell on different sides of the thin selectively electron permeable metal foil separator of the plurality of thin selectively electron permeable metal foil separators separating the two compartments;
  wherein the first cell, the last cell and the intermediate cell do not comprise an anode and a cathode separated by an electrolytic solution;
  wherein a voltage is generated across the thin selectively electron permeable metal foil separator of the plurality of thin selectively electron permeable metal foil separators of the first cell, the last cell and the at least one intermediate cell in each of the first, last and intermediate flow-through cells;
  wherein the thin selectively electron permeable metal foil of the first cell is disposed between a first current collector and one of the plurality of ion selective membranes;
  wherein the thin selectively electron permeable metal foil of the last cell is disposed between a second current collector and another of the plurality of the ion selective membranes,
  wherein the first current collector and the second current collector are connected to the external load.

2. The battery of claim 1, where the first current collector and the second current collector are each fabricated from Ag/AgCl.

3. The battery of claim 1, where the plurality of metal foil separators are asymmetric with two different metals or alloys forming their two surfaces.

4. The battery of claim 1, where the plurality of metal foil separators are covered with additional thin layers of organic electron-conductive materials.

5. The battery of claim 1, where the two solutions have different ionic compositions.

6. The battery of claim 1, where the two solutions each comprise a mediator, transferring electrons to and from the metal foil separator to dissolved redox components.

7. The battery of claim 1, where the two solutions each comprise suspensions of doped polyaniline nanoparticles.

8. The battery of the claim 1, where the two solutions each comprise a suspension of polyaniline nanoparticles with the content up to 300 g/L.

9. The battery of claim 1, where the two solutions comprise a reducing donor solution and an oxidizing acceptor solution, wherein the reducing donor solution comprises a suspension of polyaniline nanoparticles in the form of leucoemeraldine, and the oxidizing acceptor solution comprises a suspension of polyaniline nanoparticles in the form of pernigraniline.

* * * * *